(12) United States Patent
Tal et al.

(10) Patent No.: US 7,970,107 B2
(45) Date of Patent: Jun. 28, 2011

(54) METHOD AND SYSTEM FOR AUTOMATED AND SELECTIVE DETERMINATION OF CALL COMPLETION SERVICES

(75) Inventors: Oren Tal, Tel-Aviv (IL); Reuven Tal, Tel-Aviv (IL)

(73) Assignee: On-Q Telecom Systems Co., Inc., Cheyenne, WY (US)

( * ) Notice: Subject to any disclaimer, the term of this patent is extended or adjusted under 35 U.S.C. 154(b) by 1273 days.

(21) Appl. No.: 11/462,955

(22) Filed: Aug. 7, 2006

(65) Prior Publication Data

US 2007/0047695 A1 Mar. 1, 2007

Related U.S. Application Data

(60) Provisional application No. 60/706,224, filed on Aug. 8, 2005.

(51) Int. Cl.
*H04M 1/64* (2006.01)
*H04L 12/66* (2006.01)

(52) U.S. Cl. ..................... 379/88.04; 370/229; 370/352; 370/356; 379/88.02; 379/201.02; 379/207.04; 379/210.01; 379/265.12

(58) Field of Classification Search ................ 370/229, 370/338, 352, 389, 356; 379/88.13, 142.17, 379/210.01, 221.09, 201.02, 265.12, 88.02, 379/88.04, 207.04
See application file for complete search history.

(56) References Cited

U.S. PATENT DOCUMENTS

| | | | |
|---|---|---|---|
| 5,933,778 A | 8/1999 | Buhrmann et al. | |
| 6,101,242 A * | 8/2000 | McAllister et al. | 379/88.02 |
| 6,122,357 A * | 9/2000 | Farris et al. | 379/207.02 |
| 6,167,119 A * | 12/2000 | Bartholomew et al. | 379/88.04 |
| 6,351,464 B1 * | 2/2002 | Galvin et al. | 370/356 |
| 6,707,901 B1 * | 3/2004 | Hodges et al. | 379/221.09 |
| 6,798,876 B1 * | 9/2004 | Bala | 379/265.12 |
| 7,200,215 B2 * | 4/2007 | Brown et al. | 379/210.01 |
| 7,260,198 B1 * | 8/2007 | Scott et al. | 379/142.17 |
| 7,342,917 B2 * | 3/2008 | Mohan et al. | 370/352 |
| 7,349,333 B2 * | 3/2008 | Zellner | 370/229 |
| 2003/0043974 A1 * | 3/2003 | Emerson, III | 379/88.13 |
| 2003/0063590 A1 * | 4/2003 | Mohan et al. | 370/338 |
| 2004/0062383 A1 | 4/2004 | Sylvain | |
| 2004/0125800 A1 * | 7/2004 | Zellner | 370/389 |
| 2005/0047563 A1 | 3/2005 | Fellenstein et al. | |
| 2006/0104429 A1 * | 5/2006 | Wouterse et al. | 379/210.01 |
| 2007/0047695 A1 * | 3/2007 | Tal et al. | 379/67.1 |
| 2008/0317230 A1 * | 12/2008 | Karimi-Cherkandi et al. | 379/201.02 |
| 2009/0109959 A1 * | 4/2009 | Elliott et al. | 370/352 |

OTHER PUBLICATIONS

International Search Report for International Application No. PCT/US06/31009, dated Apr. 10, 2007.

* cited by examiner

*Primary Examiner* — Gerald Gauthier
(74) *Attorney, Agent, or Firm* — Leason Ellis LLP

(57) ABSTRACT

A method and system for providing a call completion service for a call between a caller and a destination over a network. Outgoing and Incoming call profiles, identifying enabled call completion services, are associated with callers and destinations, and are retrieved from a database based on the particular caller and destination. The caller and destination profiles are compared to select the appropriate call completion service for the call. In the absence of retrieving an outgoing call profile and an incoming call profile, a default profile can be generated and associated with the respective party to enable determination of the call completion service. The determination is made, at least in part, on the basis of a common call completion service identified as being enabled in both the OCP and the ICP. Additionally, a hierarchy of call completion services can be further considered in the determination of the call completion service.

32 Claims, 2 Drawing Sheets

METHOD AND SYSTEM FOR AUTOMATED AND SELECTIVE DETERMINATION OF CALL COMPLETION SERVICES This application claims priority pursuant to 35 U.S.C. §119 from Provisional Patent Application Ser. No. 60/706,224, entitled "Enabling-Disabling of Voice-Mail System," filed Aug. 8, 2005, the entire enclosure which is hereby incorporated by reference.

FIELD OF THE INVENTION

This invention relates to a system and method for providing a call completion service for a call between a caller and a destination, and more particularly to managing and delivering a call completion service based on information concerning the caller and the destination.

BACKGROUND OF THE INVENTION

A significant percentage of calls or communication attempts within a network fail for various reasons. One such frequent failure occurs during telephone calls on a landline or cellular phone network. However, as the delineation between phone networks and computer networks is increasingly blurred, similar types of incomplete communication failures occur on voice-over-ip systems (VoIP), text and instant messaging systems, and hybrid systems that communicate over multiple systems. A communication attempt failure can occur for various reasons including when a call destination is busy, unavailable, or simply not answering.

Several solutions have been provided to facilitate completion of a failed communication attempt, such as call-waiting, manual or automatic redialing, call forwarding, voicemail, and various automated services that transmit text messages (e.g. SMS messages) containing information concerning the call attempt to one or more of the parties of the failed communication attempt. For convenience, these services that facilitate or encourage the completion of a failed call are referred to herein as "call completion services."

One such service is known as "Who Called," or "missed calls notification to destination." When the phone of a user of the "Who Called" service is temporarily unreachable, the service transmits an SMS message to a user's phone identifying the phone numbers of all users that have tried to call him during a time in which the phone was unreachable.

Voicemail is another wide-spread call completion service, and as such, is used extensively in the every-day activity of a telephone user. One advantage of the voicemail system is that by leaving a voice message at the caller's choice, the caller can complete his active role in the call, and from that point on, if further conversation is necessary, it will be the responsibility of the called party to establish such further communication. However, there are also several disadvantages in the voicemail system for the caller. For example, monetary charges may be accrued as the connection to the voice mailbox is established, and any call completion responsibility is shifted to the call destination, who may, for various reasons, not retrieve the message, ignore the message, or misinterpret the message. Similarly, voicemail presents advantages and disadvantages to the call destination. Voicemail provides the convenience of recording messages when the user is unavailable and permitting such messages to be retrieved at the destination's convenience. However, voicemail can also require the destination to spend time and money retrieving messages, and thereby shift the cost burden of the return-call to the destination.

In addition, a family of call completion services, which can be collectively referred to as "call-back" or "ring back" services, provide call completion in a manner significantly different from voicemail. When a call can not be completed, a call-back service provides the caller with the option of being called back at a time when the system determines the call can be completed. Various call-back services are disclosed by U.S. Pat. No. 6,081,725 to Ishida and U.S. Pat. No. 6,804,509 to Okon et al. (the '509 patent is assigned to the present assignee). A call-back service leaves the responsibility of call completion with the caller. The caller receives the call-back notification when the destination is available, and then decides whether to proceed and let the system call the destination. If the caller initiates the call to the destination, from the perspective of the destination, the call is completed as a traditional incoming call and not as the second attempted call after the execution of a call-back service.

U.S. Application Publication No. 2006-0104429 A1 describes a call completion service that responds to call incompletion conditions with a menu of options. The menu of options will vary depending upon caller information, destination information, and/or network information. According to that application, the user must make a selection from the options in the menu in order for the call completion service to be activated. The act of selecting from the options in the menu consumes the caller's time and potentially money (e.g., the cost of cellphone air time). In the absence of a manual selection, no call completion service is activated.

Call completion services do not co-exist or interact well in current systems. For example, a system implementing both voicemail and a call-back service would result in a user receiving multiple voicemail messages as well as redundant SMS messages indicating what calls were missed during a period of unavailability. For reasons such as this, some network providers only offer call completion services as mutually exclusive options (e.g., a user can only subscribe to voicemail or a call-back service, but not both).

However, each type of call completion service has its advantages and disadvantages. Currently, the call-completion service utilized for a particular incomplete call is typically determined by the destination (i.e., by which call completion service is subscribed to by the destination). Thus, the caller has the option of either cooperating with the destination-determined call completion service or disconnecting the call without receiving the advantage of any call completion service. The caller, however, is aware of the intended purposes of the call, and thus has an increased contextual awareness of which call completion service is most appropriate for the purpose of the call. Additionally, the monetary burden of the call typically rests with the caller, thereby potentially requiring the caller to bear the monetary burden of the destination's choice of call completion service.

The present invention provides needed improvements in the management and delivery of call completions services.

SUMMARY OF THE INVENTION

In accordance with one aspect of the present invention, a method is provided for providing a call completion service for a call between a caller and a destination over a network. An outgoing call profile (OCP) associated with the caller and an incoming call profile (ICP) associated with the destination are retrieved from a database. The OCP and ICP each include call completion service parameters identifying any enabled call completion services. An appropriate call completion service for the call is selected automatically. The selection is made, at least in part, on the basis of a common call completion service identified as being enabled in both the OCP and the ICP. Once it is determined that the call can not be completed, the call completion service is executed.

In accordance with further aspects of the present invention, the OCP call completion service parameters further identify a hierarchy of call completion services. The call completion service can be determined on the basis of a highest ranking call completion service identified.

In yet a further aspect of the present invention, a method is provided for providing a call completion service for a call between a caller and a destination over a network. A database containing a plurality of outgoing call profiles (OCPs) and incoming call profiles (ICPs) associated with callers and destinations respectively is provided. The database can be queried for any ICP associated with the destination of the call and any OCP associated with the caller of the call. Any ICPs and OCPs satisfying the database query are retrieved from the database. In the absence of retrieving at least one OCP associated with the caller or at least one ICP associated with the destination, a default call profile is created having at least one call completion service selected for the absent profile. Any default profiles created for the absent ICP or OCP are treated as the retrieved ICP or OCP, respectively. The ICP associated with the destination and the OCP associated with the caller are compared in order to determine the call completion service for the call on the basis of a common call completion service identified as being enabled in both the OCP and the ICP. Once it is determined that the call can not be completed, the call completion service is executed.

In yet a further aspect of the present invention, a system is provided for a call completion service for a call between a caller and a destination over a network. The system includes a database configured to store outgoing call profiles (OCPs) and incoming call profiles (ICPs) that are associated with callers and destinations respectively. Each OCP and ICP can include call completion service parameters that identify any enabled call completion services. The system further includes a computer connected to the database and the network. The computer includes a processor configured to execute a system control software program having a database manager module configured to query the database for any OCP associated with the caller and any ICP associated with the destination, and retrieve any ICP and OCP that satisfies the query. The system control software further includes a profile matching module configured to compare any ICP and any OCP retrieved by the database manager to determine the call completion service for the call on the basis of a common call completion service identified as being enabled in both the OCP and the ICP. Additionally, the control system software includes a call completion manager configured to determine that the call can not be completed and execute the call completion service in response.

These and other aspects, features and advantages will be apparent from the following description of certain embodiments and the accompanying drawing figures.

BRIEF DESCRIPTION OF THE DRAWINGS

The foregoing and other features of the present invention will be more readily apparent from the following detailed description and drawings of the illustrative embodiments of the invention wherein like reference numbers refer to similar elements throughout the views and in which.

DETAILED DESCRIPTION OF CERTAIN PREFERRED EMBODIMENTS

By way of overview and introduction, the present invention comprises a method and system for providing a call completion service to be used for a call over a network that can not be completed between a caller and a destination. Each party involved in the call (i.e., a caller and a destination) can specify or establish a caller profile that identifies which of the call completion services available on the network are enabled for each respective party. The user can further create different call profiles for incoming and outgoing calls. Therefore, a user who is amenable to leaving to leaving a voicemail, but does not want to listen to voicemail, can enable voicemail for outgoing calls (e.g., enable voicemail in the outgoing call profile (OCP)) and disable voicemail for incoming calls (e.g., disable voicemail in the incoming call profile (ICP)).

Using these profiles, a system and method according to an aspect of the present invention permits the caller to select (or pre-select) a call completion service that differs from the destination's selection in this respect.

When a caller attempts to communicate with (i.e., call) a destination, when the system determines that the call can not be completed, for example because the destination is unavailable, the ICP and OCP can be analyzed to determine an appropriate call completion service. The call completion service is executed, and if necessary, the caller is redirected to the call completion service (e.g., a paging service or voicemail service). Thus, a communication service can offer multiple call completion services to a single customer, and automatically provide the appropriate call completion service.

In this aspect of the invention, if a caller, who has enabled voicemail, is unable to complete a call to a destination that has also enabled voicemail, because voicemail is a common-enabled call completion service, the caller will be directed to leave a voicemail. However, if a caller who has enabled both voicemail and ring-back is unable to complete a call to a destination that has only enabled ring-back, when it is determined that the call can not be completed, the ring-back service is executed, because it is the common-enabled call completion service.

Figure 1:
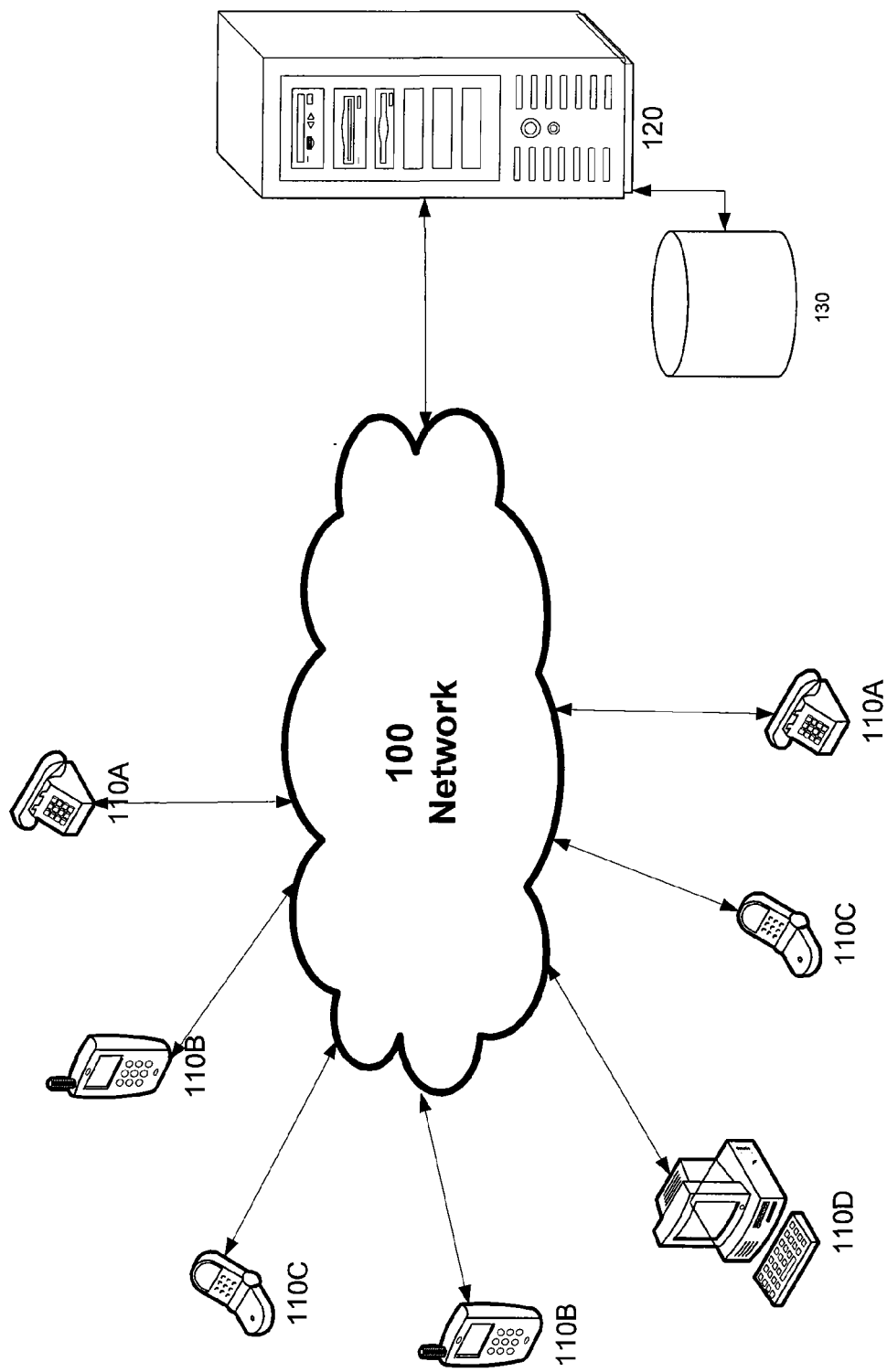
FIG. 1 illustrates an embodiment of a communication network that connects communication devices to a call completion server over a network.

With reference to FIG. 1, a server 120 is connected to multiple user devices 110A-110D over network 100. User devices 110A-110D can include various types of communication devices, such as a land-line telephone 110A, a PDA 110B, a cellular phone 110C, and a personal computer 110D. Furthermore, while the server 120 is shown connected to user devices 110A-110D over the same network, it would be understood by one of skill in the art that the server 120 can include multiple network interfaces to communicate with user devices 110A-110D on various and disparate networks. Thus, a cellular phone 110C can communicate with a computer 110D, and the server 120, making use of call profiles stored in a database 130, can provide call completion services to either party because it is connected to both networks.

It should be noted that for convenience, any communication attempt, such as a phone call, an internet voice communication, a voice over IP (VoIP) communication, an instant message, or a communication bridging multiple services shall be hereinafter referred to as a "call." As the varying communication networks mature, the delineation between the communication services is blurred. Furthermore, non-telephonic communication systems have begun offering similar sets of services including analogous forms of away messages, voicemail, and ring-back. The caller and destination need not be using the same communication service. For example, a VoIP phone can easily communicate with a cellular phone or landline telephone through the network 100. Similarly, instant messages can be sent and received on cellular phones as well as computers.

It should further be understood by one of ordinary skill in the art that caller and destination are not limited to people. Rather, the caller and destination can be a person, a computer, another machine, or a combination thereof. For example, machines and computers are frequently used to place and receive automated calls for marketing or customer service. In the case of customer service answering system, the destination is typically a computer, which provides a series of prompts to identify the correct person to which to forward the call. Similarly, tele-marketing calls are frequently placed by a machine to multiple phones simultaneously. As the tele-marketing calls are answered, the computer placing the calls, forwards the call to a live person to talk to the destination. Thus, a user can establish VoIP calls using personal computer 110D or personal computer 110D can automatically place or receive calls.

Figure 2:
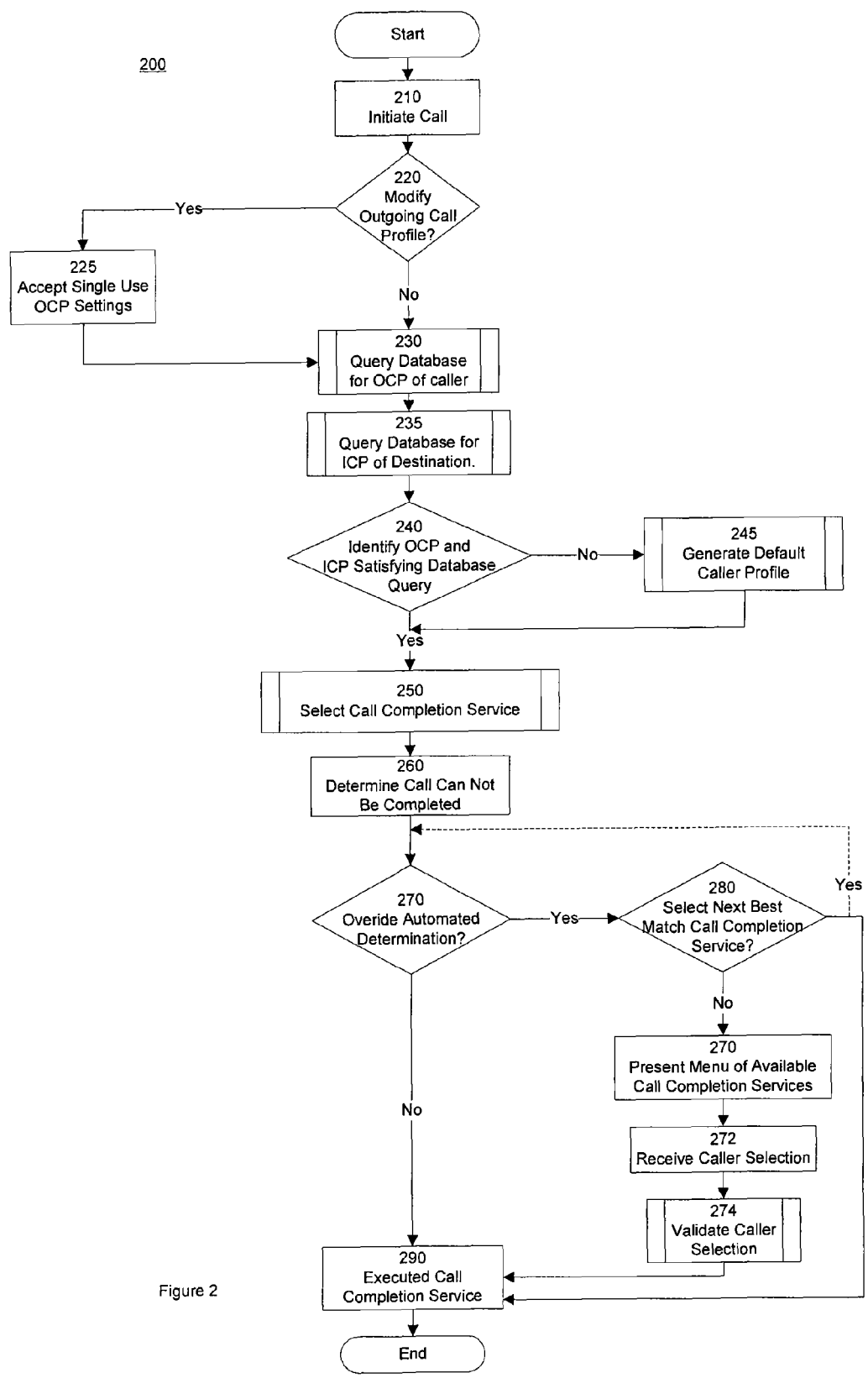
FIG. 2 depicts a flow diagram illustrating steps of a process in accordance with an embodiment of the present invention.

FIG. 2 depicts a flow diagram illustrating steps of a process 200 in accordance with an embodiment of the present invention. A call is initiated by a caller at step 210 by identifying the destination to be called. As previously discussed, either the caller or destination can include a person a machine. Preferably, the call completion determination process is automated by a computer executing software configured to access the database, communicate over the various networks, and execute the call completion services selected.

The caller can be presented with the option of modifying the OCP record in the database 130 that is to be used for this call at step 220. This service can be accessed by entering an access code during the call initiation process or by being presented with a prompt from the system to enter any changes to the OCP. It should be noted that the step of modifying the OCP can be performed at any point in process 200 (and in a process not associated with any particular call to any particular destination) until the OCP and ICP are compared to determine the call completion service. Typically, a caller will know what modifications to the OCP are desired before placing the call, because the caller will know the destination. However, if the caller assumes the call will be completed, it may be desirable to defer the steps of modifying the OCP until it has been determined that the call can not be completed.

If the caller decides to modify the OCP, the system can accept a single-use OCP at step 225. The single-use OCP can be generated by inputting all the necessary settings for the OCP (e.g., enabling the desired call completion services). Alternatively, the single-use OCP can be generated by specifying one or more modifications to the caller's OCP.

At step 230, the system queries a database storing OCPs and ICPs associated with users for any OCP associated with the caller, and at step 235, the system queries the database for any ICP associated with the destination. A caller can be associated with multiple OCPs, and similarly, a destination can be associated with multiple ICPs. Each call profile can store, or be indexed by, the conditions under which it is active. Alternatively, a single OCP or ICP can effectively specify multiple profiles by identifying enabled and disabled call completions services and the conditions under which those services are active. Additionally a subscriber can identify a particular OCP and a particular ICP as the default OCP and ICP, such that if no OCP or ICP exists for the specific activation parameters, the default profile is used.

For example, the caller may desire to enable the call-back service during business hours, but disable the call-back service during the evening so as not to be interrupted while sleeping or spending time away from the office. To address this condition, the caller can be associated with an OCP that specifies that from 9:00 AM to 6:00 PM, both call-back and voicemail are enabled, but from 6:01 PM to 8:59 AM, only voicemail is enabled. Thus, the activation parameters are stored within the OCP. Alternatively, two OCPs can be associated with the caller. One OCP is only active from 9:00 AM to 6:00 PM and specifies both voicemail and call-back are enabled, and a second OCP that is active from 6:01 PM to 8:59 AM and specifies that only voicemail is active.

Call profiles can be specified and indexed on a broad range of activation parameters. For example, as discussed, call profiles can be selected by time of the call. Alternatively, call profiles can be associated with a call incompletion status (i.e., the call completion service executed can be selected based on whether the call was not answered, the destination was not active within the network, or if the destination was already on a call). For example, if a destination is deemed unavailable because the destination did not answer the call, it would not benefit the caller to activate the call-back service, because the call-back service would merely result in an immediate notification that the destination is available, but the destination would still likely not answer the call. Therefore, a caller can specify that voicemail or "who-called" should be used if the destination does not answer the call.

Activation parameters can be based on any information stored within the system. Further activation parameters can be associated with other variables. An activation parameter can specify that a call profile is only active for a certain number of calls. The activation parameter may also be based on the failure mode of the call.

Once the database is queried, the relevant OCPs and ICPs are retrieved, and at step 240, the system determines whether at least one OCP associated with the caller and at least one ICP associated with the destination satisfied the database query. If the database query did not locate an ICP associated with the destination, a default caller profile can be generated at step 245 and associated with the destination. Additionally, if the database query did not locate an OCP associated with the caller, a default caller profile can be generated at step 245 and associated with the caller.

Generating a default profile and associating it with either the caller or destination for whom the system was unable to determine a call profile enables the call completion service selection to be selected and executed even if one of the parties to the call does not subscribe to the service or can not be associated with a caller profile for some other reason (e.g., a cell-phone user roaming in an analog network).

At step 250, the system determines that the call between the caller and the destination can not be completed. Call incompletion can be due to many factors. For example, the destination may be involved in another phone call or unable to reach the phone. Alternatively, a phone may be disconnected from the network or, in the case of a cell-phone, roaming on a network that does not provide call completion services. These failures to complete a call and the detection thereof are conventional Once the system has identified at least one OCP associate with the caller and at least one ICP associate with the destination, the system can compare the parties' caller profiles and determine the appropriate, or best-batch, call completion service at step 260. The determination of the call completion service selected for the call can include analysis and consideration of many parameters and variables. The comparison of the ICP and OCP is preferably performed by a computer configured to analyze the call profiles and utilize a rule base that identifies the importance and priority of each parameter considered.

Preferably, the comparison considers which call completion services are enabled in both the OCP and the ICP. In a further feature of the invention, the OCP and ICP can include a ranking of each call completion service, thus designating a hierarchy of preferred call completion services. The system can then analyze the hierarchy and select the call completion service based on the highest ranked mutual match, or the highest ranked match of one of the parties. Because the burden of the call completion service is typically resides with the caller, a caller's preferences are generally weighted more heavily in the determination of the call completion service.

The comparison of the OCP and ICP can consider any of the activation parameters associated with the call profiles. As discussed above, activation profiles can be associated with a call profile on a one-to-one basis. Under such circumstances, the system can retrieve multiple OCPs and ICPs associated with the caller and destination respectively, and analyze all the profiles that satisfy the database query. However, the database query can also include data concerning the relevant activation parameters such that the query is satisfied by only one OCP and one ICP.

The rule-based engine that determines the call completion service can further analyze relevant logged data, discussed below, concerning the history of selected call completion services. Specifically, the history of call completion services selected by either the caller or the destination can be considered. Preferably, the call completion service history of the particular caller-destination pair can be considered. Additionally, the rule-based engine can further consider the history of the call completion service selected during the time period of the call, the reason for failure of the call, or the reason for unavailability of the destination.

Call profiles can further include a call completion service preference based on the cost of the service. Thus, a subscriber can indicate a preference to always use the least costly call completion service. Alternatively, ambiguity between two call completion services can be resolved by the system providing the call completion service by selecting the most expensive service in order to maximize profits.

Selecting the call completion service at step 260 can be performed at various points in a call's lifecycle. A simple determination that considers only the OCP and ICP of the caller and destination can be performed as soon as the caller and destination are known to the system. The system does not need to wait until it has been determined that the call can not be completed. Determining the appropriate call completion service prior to determining the call can not be completed reduces delays in executing the call completion service. However, because calls are more frequently successful than failed, it may also be desirable to delay the processing associated with determining the call completion service until it has been determined that the call can not be completed. Furthermore, delaying the determination of the call completion service enables the system to include an analysis of destination status and call failure status. A hybrid approach can also be implemented whereby an initial call service completion determination is performed after the call has been initiated, and as additional information is gathered, the call completion service determination is narrowed by considering the additional information.

Preferably, the comparison considers which call completion services are enabled in both the OCP and the ICP. Selecting a call completion service that is not enabled in both the call profiles would ordinarily be a basic violation of the purpose of the ICP and OCP. However, circumstances may arise when overriding this rule would be preferable, or even necessary. For example, a caller may know that he/she will be unavailable for a prolonged period of time, but urgently needs to leave a message with the destination. If the destination has not enabled voicemail in the ICP, the caller will be unable to leave a message. In this circumstance, it would be desirable to allow the caller to override the ICP associated with the destination. Thus, at step 270, the caller can override the selected call completion service.

Call completion service override 270 can be initiated when the caller enters an identifying code or signal, such as a key-press or combination of keys. Alternatively, the caller can be prompted to override the determined call completion service. Certain destinations can be enabled for override by certain callers, such as any number associate with a family member or employee. This setting can be included in the call profile in the database 130. A prompt can be enhanced by presenting the user with the call completion service that will be executed if the caller does not override the selection. The presentation of the call completion service can be audible or visual (i.e., a symbolic or text based indication).

If the caller overrides the automated call completion service at step 270, the caller can be presented with the option of selecting the next most-preferred call completion service at step 280. If the caller selects the next most-preferred call completion service at 280, the system can proceed directly to executing the service at step 290. Alternatively, the process can loop to step 270 (see broken line) where the caller is given the opportunity to override this "next most-preferred call completion service." This procedure can repeat until either the caller allows one of the call completion services to proceed to execution, or there are no further acceptable call completion services.

Alternatively, if the caller overrides the automated call completion service determination at step 270, the caller can be presented with a menu of available call completion services at step 282. Preferably, the menu presents a list of call completion services that are enabled by the ICP associated with the destination. At step 284, the system receives the caller's selection from the menu of call completion services. The caller's selection can be validated at step 286 as one of the call completion services enabled by the ICP associated with the destination.

By enabling the caller to override the selection of a call completion service at various points throughout the process 200, the system enables the caller to toggle between an automated determination of the call completion service and a user-selection of the call completion service. If the caller immediately overrides the automated determination of the call selection service, the caller effectively toggles the system to enter a user-selection mode of operation. In the event of no "override," the call completion service can be executed free of any service selection by the caller.

Once a call completion service is selected, either through steps 282, 284, and 286 or through step 260, the call completion service is executed at step 290. It should be noted that while FIG. 1 illustrates user devices 110A-110D connected to server 120 through a single network 100, the system can communicate with devices across multiple networks and network segments and even disjoint networks. Thus, the call completion service can be executed over a network that is different from the network over which the call was placed as well as the same network. By way of example, a modified ring-back service can be provided by which the caller is sent and instant message when the destination becomes available.

A caller using a landline phone can participate in this service by associating a screen name with his/her caller profiles or providing the screen name at the time of selecting the particular call completion service. Thus, a user can place a call over a traditional telephone network, and receive the results of the call completion service over the Internet.

Each incomplete call that utilizes a call completion service can be logged and stored in the database. Storing and indexing information concerning each use of a call completion service enables more accurate and customized automated determination of the appropriate call completion service. For example, the frequency of use of each call completion service can analyzed by a process of the server 120 to determine the preferred call completion service for a particular caller. Alternatively, caller-destination pairs can be analyzed to determine which call completion services is most frequently used between a caller and a destination. The logged data can also be analyzed to determine which call completion service is used most frequently during the time of day of the call.

As discussed, the OCP and ICP associated with a subscriber significantly control the process of determining the appropriate call completion service. Thus, in another aspect of the invention, the system can provide and interface to the subscriber to modify the OCP and ICP associated therewith. The interface can be provided through any type of subscriber profile management interface known in the art. Profile management interfaces can be provided, for example, through the Internet or World Wide Web, an automated phone interface, or an SMS interface. The profile management interface can be accessed at multiple points throughout the process 200.

While the invention has been described in connection with a certain embodiment thereof, the invention is not limited to the described embodiments but rather is more broadly defined by the recitations in the claims below and equivalents thereof.

We claim:

1. A method for providing a call completion service for a call between a caller and a destination over a network, comprising the steps of:
   retrieving from a database an outgoing call profile (OCP) associated with the caller and an incoming call profile (ICP) associated with the destination, the OCP and ICP each including call completion service parameters identifying any enabled call completion services;
   automatically selecting the call completion service for the call on the basis of a common call completion service identified as being enabled in both the OCP and the ICP;
   determining that the call can not be completed; and
   executing the call completion service.

2. The method of claim 1, wherein the OCP call completion service parameters further identifies a call completion service hierarchy, the method further comprising the step of determining the call completion service for the call on the further basis of a highest ranking call completion service identified by the OCP.

3. The method of claim 1, wherein the selecting step is performed when the call is initiated.

4. The method of claim 1, wherein the selecting step is performed after the determining step.

5. The method of claim 1, wherein the selecting step comprises comparing the OCP and the ICP.

6. The method of claim 1, further comprising the steps of:
   enabling the caller to override the call completion service determined by the selecting step;
   providing a menu of call completion services to the caller; and
   receiving the call completion service from a user-selection from the menu of call completion services.

7. The method of claim 6 further comprising the step of verifying the call completion service as one of the call completion services identified as being enabled by the ICP.

8. The method of claim 6, wherein the menu of call completion services excludes the call completion services not identified as being enabled by the ICP.

9. The method of claim 1, further comprising the steps of providing an interface to a subscriber that enables the subscriber to modify at least one of the OCP and ICP associated with the subscriber.

10. The method of claim 9, wherein the interface is provided through a website.

11. The method of claim 9, wherein the interface is provided through SMS.

12. The method of claim 1, wherein the call completion services include a voicemail service, a callback service, and a missed call notification service.

13. The method of claim 1, further comprising the steps of:
   enabling the caller to override the call completion service; and
   accepting an override call completion service as the call completion service.

14. The method of claim 1, further comprising the step of receiving a single-use OCP from the caller prior to initiating the call.

15. The method of claim 14, further comprising the step of generating the single-use OCP using the OCP associated with the caller as a basis for the single-use OCP.

16. The method of claim 14, wherein the step of receiving a single-use OCP includes receiving an indication of whether the single-use OCP identifies voicemail is enabled.

17. The method of claim 1, wherein one or more OCPs and ICPs are associated with a subscriber, and the call completion service parameters further identify an activation parameter.

18. The method of claim 17, wherein the activation parameter of one of the plurality of OCPs and ICPs includes an indication that the particular OCP and ICP is a default OCP and ICP respectively.

19. The method of claim 17, wherein the activation parameter indicates one or more addresses for which the respective OCP or ICP is active.

20. The method of claim 17, wherein the activation parameter indicates a time period during which the respective OCP or ICP is active.

21. The method of claim 17, wherein the activation parameter indicates the number of calls for which the respective OCP or ICP is active.

22. The method of claim 17, wherein the activation parameter indicates at least one of a plurality of failure modes for which the respective OCP or ICP is active.

23. The method of claim 1, wherein the selecting step includes the further step of analyzing at least one of a caller status and a destination status to determine the call completion service.

24. The method of claim 1, further comprising the step of logging data concerning the selected call completion service.

25. The method of claim 24, wherein the selecting step further includes analyzing a selection of the logged call completion service data.

26. The method of claim 1, wherein the execution of the call completion service utilizes the same network as the call.

27. The method of claim 1, wherein the caller initiating the call includes an automated system.

28. The method of claim 1, wherein the destination of the call includes an automated system.

29. A method for providing a call completion service for a call between a caller and a destination over a network, comprising the steps of:
- providing a database containing a plurality of outgoing call profiles (OCPs) and incoming call profiles (ICPs) associated with callers and destinations respectively, wherein each OCP and ICP includes call completion service parameters identifying any enabled call completion services;
- querying the database for any ICP associated with the destination of the call and any OCP associated with the caller of the call;
- retrieving from the database any ICPs and OCPs satisfying the database query;
- in the absence of retrieving at least one OCP associated with the caller or at least one ICP associated with the destination, creating a default call profile having at least one call completion service selected for said absent profile and defining any so-created profile as being the absent ICP or OCP, respectively;
- automatically selecting the call completion service for the call on the basis of a common call completion service identified as being enabled in both the OCP and the ICP;
- determining that the call can not be completed; and
- executing the call completion service.

30. A system for providing a call completion service for a call between a caller and a selected destination over a network, comprising:
- a database configured to store a plurality of outgoing call profiles (OCPs) and incoming call profiles (ICPs) associated with callers and destinations respectively, wherein each OCP and ICP includes call completion service parameters identifying any enabled call completion services; and
- a computer connected to the database and the network, the computer having a processor configured to execute a system control software program having
  - a database manager module configured to query the database for any OCP associated with the caller and any ICP associated with the destination, and retrieve any ICP and OCP that satisfies the query,
  - a profile matching module configured to select the call completion service for the call on the basis of a common call completion service identified as being enabled in both the OCP and the ICP;
  - a call completion manager configured to determine that the call can not be completed and execute the call completion service.

31. The system of claim 30, wherein the profile matching module is further configured to generate a default call profile having at least one call completion service selected in the absence of an OCP associated with the caller not, and in the absence of an ICP associated with the destination.

32. The system of claim 30, wherein the system control software program executes as a background process after the destination of the call is selected.

* * * * *